United States Patent
Iwanicki et al.

(10) Patent No.: US 6,815,954 B2
(45) Date of Patent: Nov. 9, 2004

(54) METHOD AND APPARATUS FOR FULL OFFSET RESISTIVITY IMAGING FOR USE IN BOREHOLES

(75) Inventors: William David Iwanicki, Calgary (CA); Wade Stewart Maxfield, Weatherford, TX (US); Stephanie A. Michels, Cleburne, TX (US); Peter J. Schoch, Fort Worth, TX (US)

(73) Assignee: Computalog USA, Inc., Fort Worth, TX (US)

( * ) Notice: Subject to any disclaimer, the term of this patent is extended or adjusted under 35 U.S.C. 154(b) by 0 days.

(21) Appl. No.: 10/339,102

(22) Filed: Jan. 9, 2003

(65) Prior Publication Data

US 2003/0164706 A1 Sep. 4, 2003

Related U.S. Application Data

(60) Provisional application No. 60/348,867, filed on Jan. 14, 2002.

(51) Int. Cl.[7] ................................................. G01V 3/18
(52) U.S. Cl. ..................... 324/367; 324/339; 340/853.2
(58) Field of Search .......................... 340/853.2, 853.1, 340/855.3, 855.4, 855.7, 856.2; 324/355, 367, 374, 375, 220, 221; 73/152, 17; 250/268

(56) References Cited

U.S. PATENT DOCUMENTS

| | | | |
|---|---|---|---|
| 3,940,689 A | * | 2/1976 | Johnson, Jr. ................. 324/221 |
| 4,251,773 A | | 2/1981 | Cailliau et al. |
| 4,292,589 A | * | 9/1981 | Bonner ........................ 324/221 |
| 4,355,310 A | * | 10/1982 | Belaigues et al. ........ 340/853.2 |
| 4,468,623 A | | 8/1984 | Gianzero et al. |
| 4,545,242 A | | 10/1985 | Chan |
| 4,567,759 A | | 2/1986 | Ekstrom et al. |
| 4,692,908 A | | 9/1987 | Ekstrom et al. |
| 4,851,781 A | | 7/1989 | Marzetta et al. |
| 4,862,090 A | | 8/1989 | Vannier et al. |
| 5,008,625 A | | 4/1991 | Chen |
| 5,012,193 A | | 4/1991 | Chen |
| 5,038,378 A | | 8/1991 | Chen |
| 5,191,290 A | | 3/1993 | Gianzero et al. |
| 5,532,587 A | * | 7/1996 | Downs et al. ............... 324/220 |
| 6,065,218 A | | 5/2000 | Edwards |
| 6,191,588 B1 | | 2/2001 | Chen |
| 6,308,214 B1 | * | 10/2001 | Plevyak et al. ............. 709/233 |

FOREIGN PATENT DOCUMENTS

CA        685727        5/1964

OTHER PUBLICATIONS

Halliburton, Electrical Micro Imaging Service brochure, 1995, 8 pages.

* cited by examiner

*Primary Examiner*—Anjan Deb
*Assistant Examiner*—Darrell Kinder
(74) *Attorney, Agent, or Firm*—Geoffrey A. Mantooth

(57) ABSTRACT

Using micro-resistivity techniques, an image of the wall of a borehole can be obtained. A downhole tool stack is provided with plural imaging tools, wherein each imaging tool has a set of pads that deploy radially outward to contact the borehole wall to obtain the image thereof. As the pads deploy outwardly, gaps are formed between the pads. The pads of one tool are circumferentially offset relative to the pads of the other tool so that more complete circumferential coverage of the borehole wall is obtained during the imaging process. Furthermore, an adaptive polling technique is utilized to telemeter the large amounts of data generated by the two imaging tools to the surface. Data is obtained from the imaging tools by polling at a particular rate, which rate is modified depending upon the amount of data generated by the imaging tools.

15 Claims, 7 Drawing Sheets

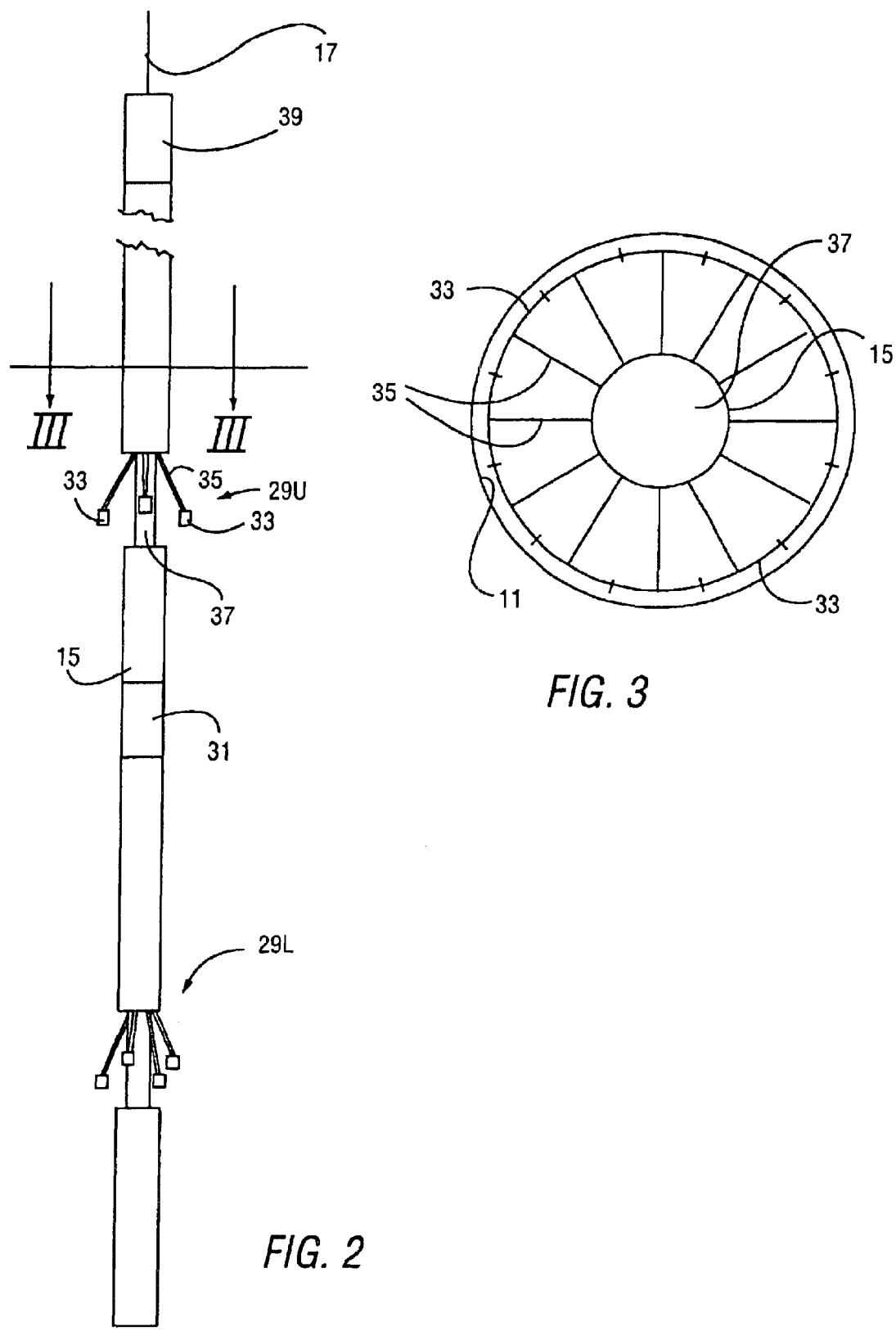

METHOD AND APPARATUS FOR FULL OFFSET RESISTIVITY IMAGING FOR USE IN BOREHOLES

This application claims the benefit of U.S. Provisional Application Ser. No. 60/348,867, filed Jan. 14, 2002.

FIELD OF THE INVENTION

The present invention relates to explorations for hydrocarbons involving electrical investigations of a borehole penetrating an earth formation. Specifically, the present invention relates to imaging the wall of the borehole with highly localized currents.

BACKGROUND OF THE INVENTION

So call micro-resistivity, or micro-conductivity, techniques have been used in open, or uncased, borehole logging to obtain a two dimensional image of the borehole wall. The techniques allow for the evaluation of the characteristics of the earth formations that are penetrated by the borehole. Structural and stratigraphic analysis of the borehole is improved. The techniques allow identification of thin beds, fractures, and faults and provide information on porosity. This information is useful in determining if the borehole has penetrated a hydrocarbon (for example oil or gas) bearing formation and whether the hydrocarbons are commercially extractable.

Micro-resistivity techniques utilize a tool having a number of deployable pads (six pads are commonly used). As the tool is run down the borehole, the pads are retracted. When the tool is readied for logging, arms extend the pads radially out. Each pad has a number of button electrodes. The buttons are closely arranged in two horizontal rows (when the tool is vertical). Current is introduced into the borehole wall through the individual button electrodes. Electronics on board the tool measure the variation in current through the individual electrodes. These measurements are then processed and interpreted to form the image of the borehole wall.

When the pads with the sensors are stowed, each pad takes up less than 120 degrees of circumference. The pads are vertically staggered when stowed. Thus, there are three upper pads and three lower pads. The pads circumferentially overlap each other. However, when the pads are deployed radially outward, there are circumferential gaps between the pads. The size of the gaps depends on the diameter of the borehole. For large diameter boreholes, the pads will be extended further radially outward than for a small diameter borehole. This is because the pads contact the borehole wall.

By design, the spatial resolution of each button electrode is small in order to increase the image resolution. Because of the small resolution of the button electrodes and the small radial spacing of the pads, the image that is produced has gaps therein (see FIG. 4). In large diameter boreholes, the gaps represent as much as one-third of the surface area of the borehole wall. The gaps degrade the quality of the image.

The present invention eliminates the gaps in the image (see FIG. 5). The present invention uses more pads that are circumferentially offset so as to cover the gaps. Using more pads generates more data that must be sent to the surface over a limited bandwidth wireline.

The present invention uses the combination of two or more tools to provide more coverage of the borehole. In common borehole sizes, the coverage is full, or 100%. In larger boreholes, the coverage may not be full, but will be greater than with the prior art.

SUMMARY OF THE INVENTION

The present invention provides a downhole tool method for obtaining a more complete circumferential image of a borehole wall using micro-resistivity techniques.

The present invention provides a downhole tool for imaging a circumference of the wall of a borehole with micro-resistivity measurements. The tool comprises an elongated body having a longitudinal axis, a first set of pads and a second set of pads. Each of the pads of the first and second sets of pads has micro-resistivity electrodes for micro-resistivity measurements. Each of the pads of the first and second sets of pads is mounted on a respective arm. Each of the pads of the first and second sets of pads is moveable from a respective stowed position against the body of the tool to a radially extended position, wherein in the extended position, the pad is structured and arranged to contact the borehole wall. Each of the pads in the first set of pads is circumferentially separated from the respective adjacent pads in the first set of pads by a gap when the first set of pads are in the extended position. The pads in the second set of pads are circumferentially aligned with the gaps of the first set of pads.

In accordance with one aspect of the present invention, the first set of pads is longitudinally spaced from the second set of pads.

In accordance with another aspect of the present invention, the tool comprises a tool stack. The first set of pads are provided by a first tool and the second set of pads are provided by a second tool. The tool stack comprises the first and second tools.

In accordance with still another aspect of the present invention, the first tool is separated from the second tool by an isolator.

In accordance with still another aspect of the present invention, the pads of the first set of pads are longitudinally separated from the pads and arms of the second set of pads.

The present invention also provides a downhole tool stack for imaging a circumference of a wall of a borehole with micro-resistivity measurements that comprises a first tool and a second tool that is longitudinally positioned from the first tool. Each of the first and second tools have plural pads, with each pad having micro-resistivity electrodes for micro-resistivity measurements. Each pad is mounted on a respective arm. Each pad and respective arm are moveable between a stowed position and an extended position. The pads are structured and arranged to contact the wall of a borehole. The pads of the first tool are circumferentially separated from each other by gaps when the pads of the first tool are in the extended position. The pads of the second tool are circumferentially aligned with the gaps.

In accordance with another aspect of the present invention, the first tool produced first data and the second tool produces second data, with the tool stack further comprising a telemetry module that polls the first tool at a first rate so as to receive the first data for telemetry uphole and that polls the second tool at a second rate so to receive the second data for telemetry uphole. The telemetry module modifies the rate of polling from the first and second rates so as to correspond to the quantity of data received as a result of the polling.

The present invention also provides a method of assembling a tool stack for imaging a circumference of a wall of a borehole with micro-resistivity measurements. The first tool is provided with deployable micro-resistivity pads. The first tool has first and second ends. A second tool is connected with the second end of the first tool. The second tool has deployable micro-resistivity pads; the pads of the second tool are circumferentially offset from the pads of the first tool. A wireline is connected with the first end of the first tool.

The present invention also provides a method of imaging a wall of a borehole with micro-resistivity measurements. The method acquires imaging data of first portions of the borehole wall from a first tool and also acquires imaging data of second portions of the borehole wall from a second tool. The second portions are interposed between the first portions.

In accordance with one aspect of the present invention, the step of acquiring imaging data for the first portions of the borehole wall from a first tool and acquiring imaging data of second portions of the borehole wall from a second tool are performed simultaneously, with the imaging data of the second portions being laterally offset from the imaging data of the first portions.

In accordance with another aspect of the present invention, the step of acquiring the imaging data of first portions of the borehole wall from a first tool further comprises the step of polling the first tool for the first tool imaging data at a first rate. The polling rate is modified from the first rate to a second rate.

In accordance with still another aspect of the present invention, the step of acquiring imaging data of second portions of the borehole wall from a second tool further comprises the step of polling the second tool for the imaging data at a third rate. The polling rate is modified from the third rate to a fourth rate.

The present invention also provides a method of imaging a wall of a borehole. A logging tool is provided in the borehole. The logging tool has a first set of pads and a second set of pads. The pads of the first set of pads have gaps therebetween. The logging tool is moved along the borehole. At a first depth, the borehole wall is logged with the first set of pads. The logging tool continues to move along the borehole. At the first depth, the borehole wall is logged with the second set of pads, the pads of the second set of pads being located in the gaps of the first set of pads at the first depth.

The present invention also provides a method of telemetering data from a downhole tool to the surface. Data is acquired from the tool by polling the tool at a polling rate. The amount of data received from the tool is determined. The polling rate is modified to correspond to the amount of data received from the tool, wherein if the amount of data received from the tool increases, the polling rate increases.

In accordance with one aspect of the present invention, the step of acquiring data from the tool further comprises the step of receiving a packet of data from the tool. The step of determining the amount of data generated by the tool further comprises the step of determining how much data is in the packet.

The present invention also provides an apparatus for telemetering data from a downhole tool stack having plural tools to the surface. The apparatus comprises means for acquiring data from one of the tools at a polling rate, means for determining the amount of data received from the tool as a result of polling and means for modifying the polling rate to correspond to the amount of data received from the one tool, wherein if the amount of data received from the one tool increases the polling rate increases.

BRIEF DESCRIPTION OF THE DRAWINGS

FIG. 2 is a schematic elevational view of the tool stack of FIG. 1.

FIG. 3 is a schematic cross-sectional view taken at lines III—III of FIG. 2.

DESCRIPTION OF THE PREFERRED EMBODIMENTS

Figure 1:
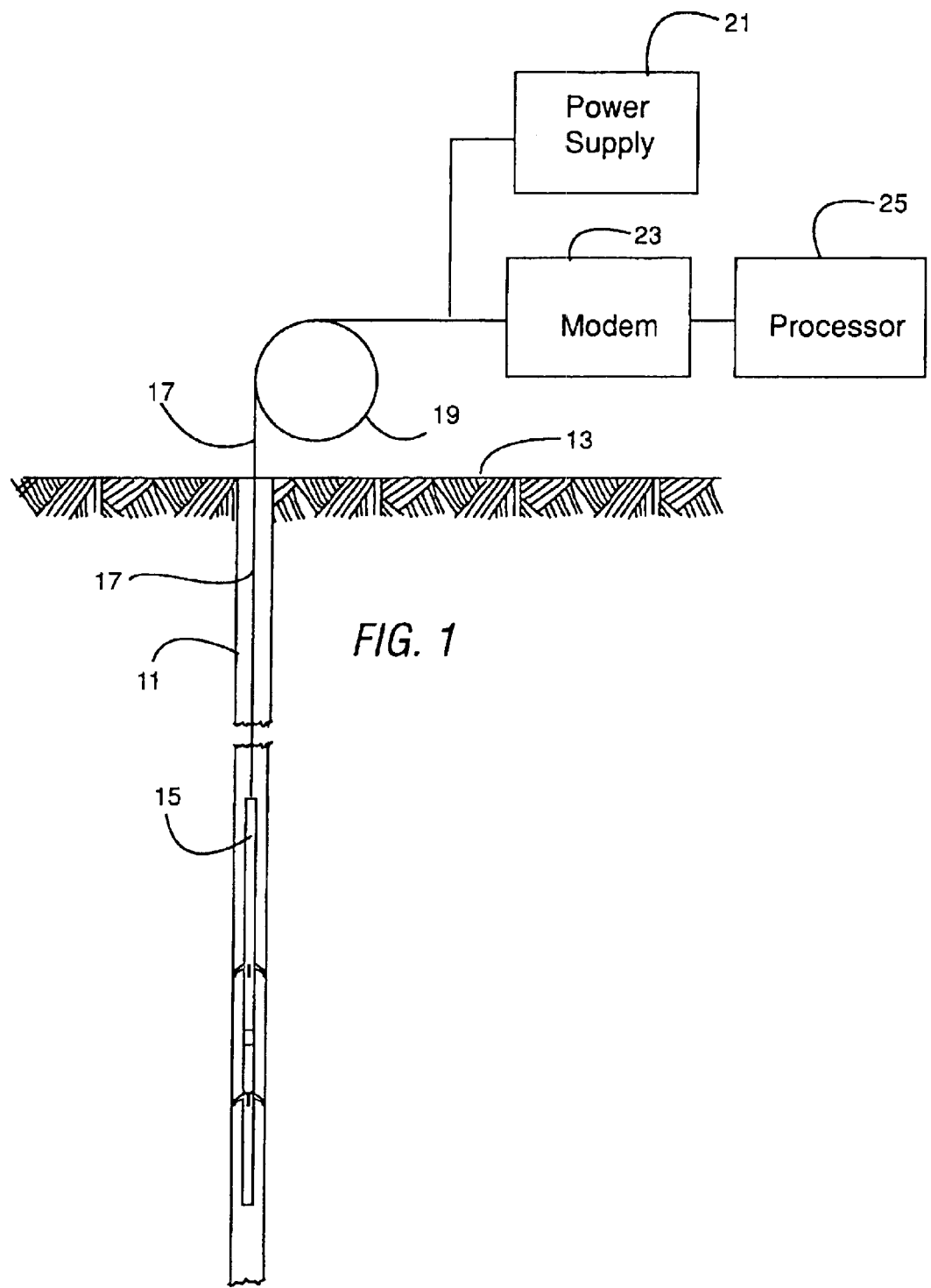
FIG. 1 is a schematic view of a borehole, showing the logging tool stack of the present invention, in accordance with a preferred embodiment.

In FIG. 1, there is illustrated a borehole showing the tool stack of the present invention, in accordance with a preferred embodiment. The borehole 11 penetrates the earth 13 extending down into various formations. The borehole 11 is uncased. The tool stack 15 is suspended in the borehole from a wireline 17. The tool stack allows the formations surrounding the borehole to be evaluated for hydrocarbon content and extractability.

The wireline 17 both suspends the tool stack 15 and provides power and data transmission capabilities. The wireline extends to the surface where it is wrapped around a drum 19 for raising and lowering the tool. The conductors inside of the wireline are connected to a power supply 21 which provides the electrical power necessary to operate the various components on the tool stack 15. In addition, the wireline 17 connects to a surface modem 23 for communication with the downhole tool stack 15. A surface processor 25 is connected to the modem 23, which processor processes the measured data to produce images of the borehole wall. In addition, the processor 25 sends commands down to the tool to control logging.

In FIGS. 2 and 3, there is shown the tool stack 15 of the present invention, in accordance with a preferred embodiment. The tool stack 15 is actually composed of dual micro-resistivity, or micro-conductivity, imaging tools 29U, 29L. The imaging tools are stacked one on top of another. Thus, there is an upper imaging tool 29U and a lower imaging tool 29L. The imaging tools 29U, 29L are substantially similar to one another. The individual imaging tools are conventional and commercially available. Such an imaging tool is discussed in more detail in U.S. Pat. No. 4,468,623, the disclosure of which is incorporated by reference herein. However, the combination of imaging tools, as described herein, is unconventional. The lower imaging tool 29L is coupled to the upper imaging tool 29U by way of an isolator 31. The isolator 31 electrically and physically isolates the tools from each other.

Each imaging tool has a set of pads 33. Each pad is coupled to an arm 35. The arm allows the pad to move between a stowed position, wherein the pad is in close proximity to the tool body 37, to a deployed position, wherein the pad 33,is radially extended outward so as to contact the wall of the borehole 11. The arms 35 are either spring loaded or motor-activated so as to push the pads 33 into contact with the borehole wall.

Figure 3A:
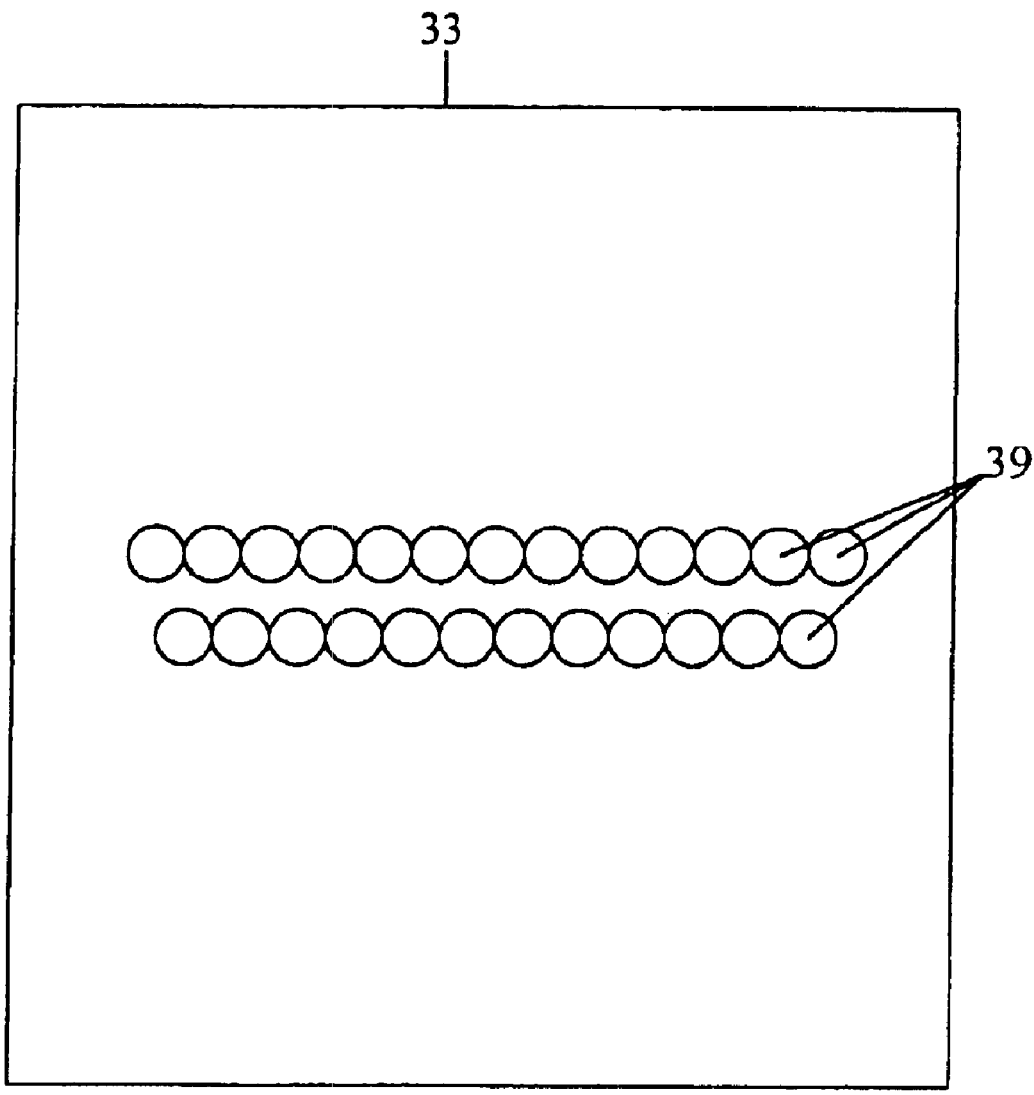
FIG. 3A is an elevational view of a pad.

Referring to FIG. 3A, each pad 33 has a series of button electrodes 39. In the preferred embodiment, the electrodes are arranged in two horizontal rows (when the tool is vertically oriented). Each pad has a number of electrodes, with the electrodes in one row being offset, or staggered, from the electrodes in the other row. During logging operations with the imaging tool 29U, 29L, current is passed continuously through the button electrodes 39 to the formations of the borehole wall. A typical operating frequency is 7.5 kHz.

The pads 33 and arms 35 of each tool are independent, and longitudinally offset, from the pads and arms of the other tool.

Each imaging tool 29U, 29L has six pads, spaced 60 degrees apart. Three of the pads, spaced 120 degrees apart from each other, are located at a high position on the tool, while the other three pads, spaced 120 degrees apart from each other, are located at a lower position on the tool. This vertical staggering allows the pads, which cover almost 120 degrees of circumferential distance when stowed, to all tightly stow together. With the present invention, the number of pads and button electrodes can change or vary.

The lower tool 29L is coupled to the upper tool 29U by way of the isolator 31. The mass isolator 31 electrically insulates the return of the lower tool 29L from the drive (pad section) of the upper tool. The tool stack 15 can include other tools 41 (see FIG. 6), such as a resistivity tool and a neutron and gamma ray lithodensity measuring tool. In addition, the tool stack includes a telemetry module 39 located near the top of the stack. The telemetry module 39 is electrically connected to the conductors of the wireline 17. In addition, the tools 29L, 29U and the telemetry module 39 are connected together by way of an inner tool bus 43 (see FIG. 6).

Figure 4:
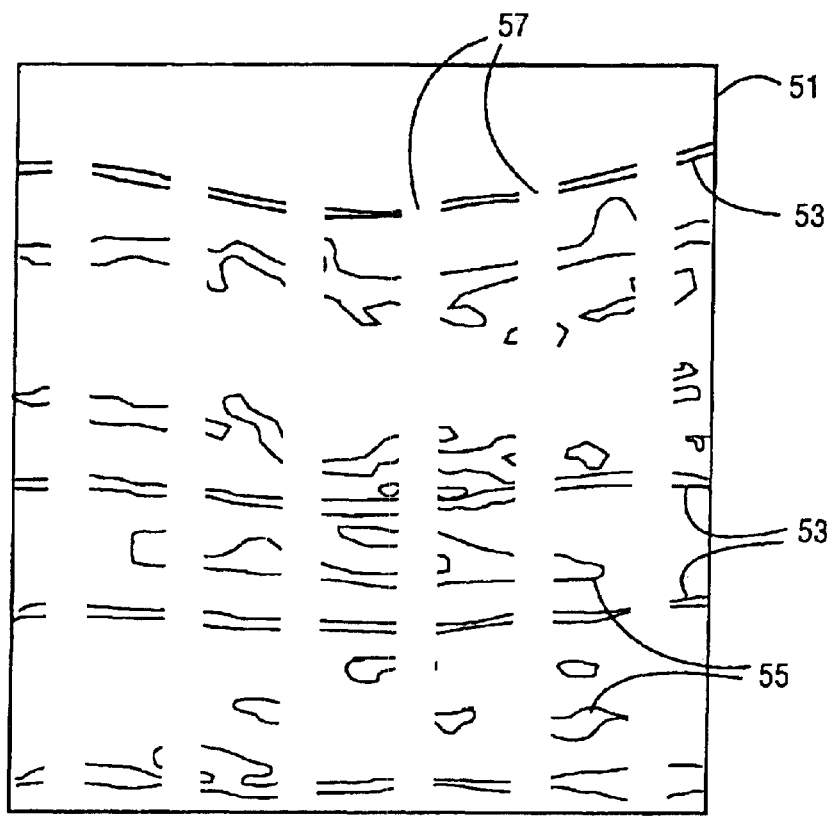
FIG. 4 is a schematic representation of a prior art image produced with micro-resistivity measurements.

FIG. 4 shows an image 51 produced by a conventional imaging tool. The image 51 is of the inside wall of the borehole 11. The left edge can be joined to the right edge to form a cylindrical representation of the borehole wall. As can be seen, signs of strata 53 are evident, as are some other interesting characteristics 55, which may be useful in determining the presence and location of oil bearing formations. The image 51 has gaps 57 therein. The vertical gaps 57 indicate a lack of data and result from the incomplete circumferential coverage of the borehole wall by the pads 33 of a conventional imaging tool. The width of the gaps 57 depends on the diameter of the borehole 11. For larger boreholes, for the same size imaging tool, the gaps become wider because the pads must extend further radially outward.

The present invention eliminates or reduces the gaps 57 in the image.

Figure 5:
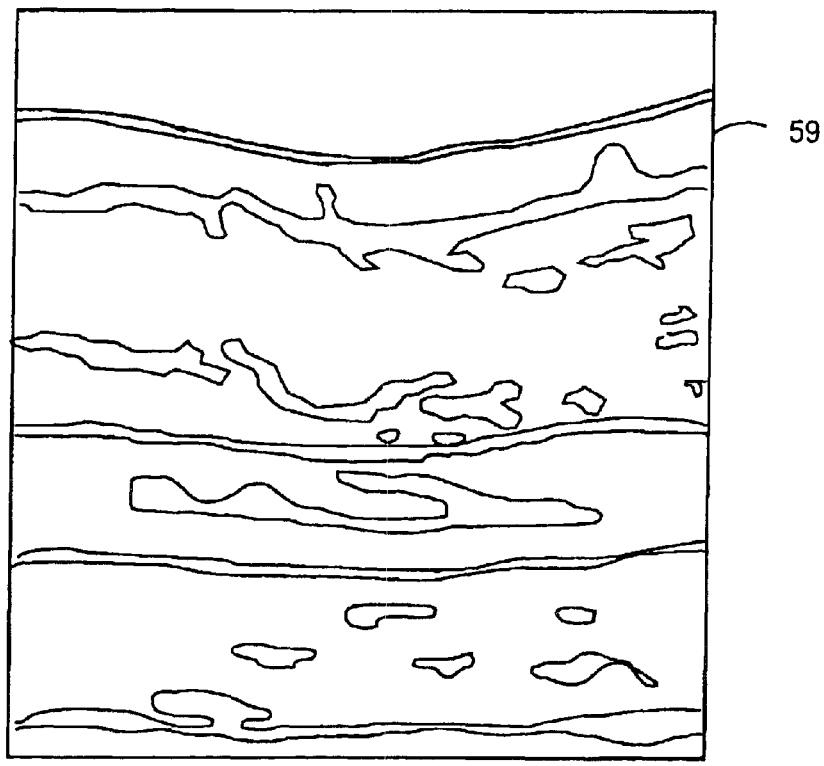
FIG. 5 is a schematic representation of an image produced with the present invention.

The pads 33 of the upper tool 29U are circumferentially staggered, or offset, with respect to the pads 33 of the lower tool 29L so that complete circumferential coverage of the wall of the borehole 11 is obtained. Thus, for the preferred embodiment, where each imaging tool 29L, 29U has six pads spaced 60 degrees apart, the pads of the upper imaging tool 29U are offset 30 degrees from the pads of the lower unit 29L. The pads of the lower tool 29L are circumferentially aligned with the gaps between the pads in the upper tool 29U, and vice versa. For boreholes of common size, this ensures complete coverage of the borehole wall, thereby eliminating any gaps in the image 59 (see FIG. 5). The images 51, 59 are of the full circumference of the borehole.

The present invention enhances the high resolution of micro-resistivity tools. By providing a gapless and complete image in boreholes of common size, more information can be obtained about the borehole. In boreholes that are larger, the gaps are substantially reduced.

To assemble the tool stack the upper and lower tools are connected with each other by way of the isolator 31. The isolator 31 can be keyed or machined so that the circumferential offset of the pads of one tool with respect to the other tool is obtained. Other tools may be added to the tool stack and the wireline 17 is connected with the upper end of the tool stack.

The tool stack may rotate within the borehole during logging operations, as resistivity measurements are taken. As the tool stack is pulled toward the surface, it may rotate about its longitudinal axis. Such rotation is a consequence of the tool stack being pulled uphole on a wireline, which wireline allows a great deal of spin or twisting along its length. For example, a particular pad may be oriented due north (in a vertical borehole) at 1,000 feet depth. As the tool stack is moved in the borehole to 980 feet, that same pad may rotate to be oriented east (a 90° rotation).

Tool stacks and tools rotate within boreholes for a number of reasons. For example, the borehole may be eccentric, the sides of the borehole may be scoured by the drill bit (with the pads tending to follow the scoured tracks in the borehole wall), or the wireline may twist or untwist. The amount of twist or rotation, and the direction of rotation, of the tool stack in a particular borehole can, in some circumstances, be predicted. Such prediction is based on previous logs or traverses of the borehole.

Because the tool stack may twist, the circumferential offset between the pads of the upper and lower tools can vary to best log the particular borehole. Ideally, the offset should be such that at any given depth, the full circumference of the borehole is imaged, or logged. Thus, the pads of the upper tool log, or image, first portions of the borehole wall, while the pads of the lower tool log, or image, second portions of the borehole wall. The individual first and second portions are bands (see FIG. 4, which shows the first portion bands located between the gaps 57). The first and second portions may be straight (as shown in FIG. 4) if the tool stack does not rotate, or may be helical if the tool stack rotates within the borehole.

At a particular depth, it is desirable to have the second portions be located within the gaps between the first portions, so as to have full coverage of the borehole wall circumference. The circumferential offset between the upper and lower tools is selected to achieve this full coverage.

In some situations, the circumferential offset on the tool stack between the pads of the upper tool and the pads of the lower tool may be zero. For such a zero offset, the pads of the upper tool are circumferentially aligned with the pads of the lower tool. Such a zero offset may be useful in certain situations. As an example, for the tool stack of the preferred embodiment, where there are two tools, with each tool having six pads separated from each other by 60°, a zero offset could be utilized if the tool rotates about 30° within a distance that is equal to the distance between the two sets of pads. Thus, if, at a particular first depth, the pads of the first tool are oriented at 0, 60, 120, 180, 240 and 300° (in a vertical borehole), the pads of the lower tool are oriented in the same direction. As the tool stack is pulled toward the surface, the tool stack will rotate 30° by the time the pads of the lower tool are at that particular first depth, wherein the pads of the second tool are located at 30, 90, 150, 210, 270 and 330°. The pads of the second tool have rotated to locate within the gaps of the first portion.

If the tool stack rotates more or less, then a nonzero offset between the pads of the two sets will be used. If the amount of rotation of the tool stack within a particular borehole is unknown, then the rotation can be hypothesized and an offset between the pads of the upper and lower tools can be chosen.

Particularly in small diameter boreholes, there will be some overlap between the first portions of the borehole wall imaged by the pads of the upper tool and the second portions of the borehole wall imaged by the pads of the lower tool. As the pads extend out farther radially, such as in a larger diameter borehole, the amount of overlap will decrease. In much larger boreholes, there will be small gaps between the first and second portions, as the pads extend so far out radially that complete circumferential coverage is not possible.

Figure 6:
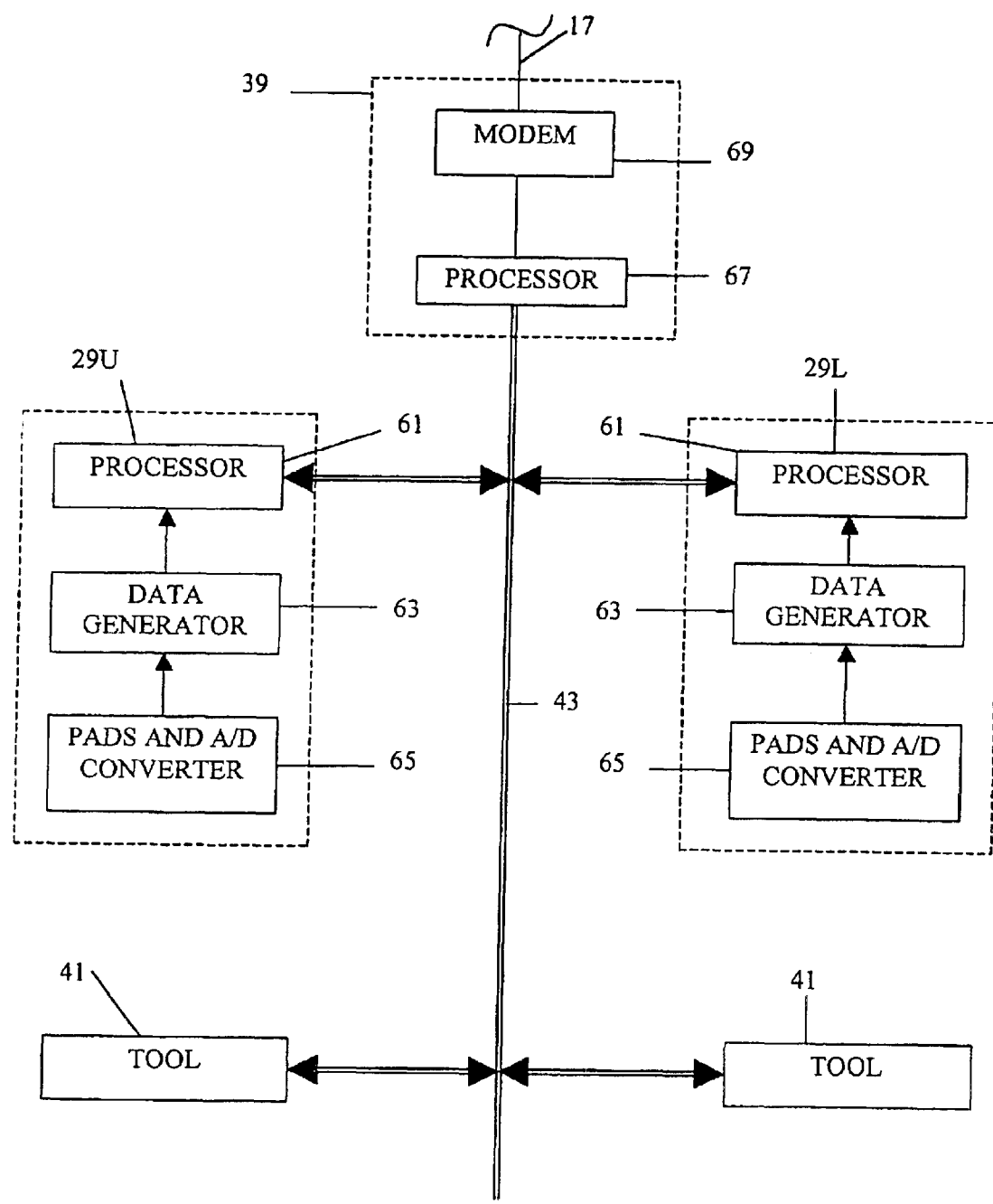
FIG. 6 is a block diagram showing the electronics of the communication module and the micro-resistivity tools.

Referring to FIG. 6, the components of the upper and lower tools 29U, 29L and the telemetry module 39 will be discussed. Each of the imaging tools 29U, 29L contains a processor 61. The processors are connected to the intertool bus 43. Each processor 61 is connected to a data generator 63. Each data generator 63 is in turn connected to the pads 33. The pads each contain active electronics 65 comprising a current source and button multiplexers. In addition, the electronics 65 of each pad has an analog-to-digital (A/D) converter associated therewith. Each tool also contains a power supply (not shown) that receives electrical power from the wireline 17.

The power supply provides electrical current for the button electrodes in the individual pads. The A/D converter in the pad electronics 65 produces digital signals of the change in current passing through the individual button electrodes. The data generator 63 and the processor 61 convert and organize the digital signals into useable forms. The processor 61 moves the data onto the bus 43 for transmission up to the surface.

The telemetry module 39 transmits the data from the tools 29U, 29L, 41 over the wireline 17 to the surface. The telemetry module 39 has a processor 67 that is connected to the bus 43. The processor 67 is connected to a modem 69, which modem transmits the data over the wireline 17 to the surface. In addition, the processor 67 receives commands through the modem 69 from the surface equipment for controlling the tools 29U, 29L and 41.

The imaging tools 29U, 29L typically generate a greater quantity of data than the other tools 41. Contributing to the large quantity of data are the number of button electrodes (typically two hundred fifty per imaging tool) and rapid acquisition of data. The wireline 17 is a communications channel having a limited bandwidth.

The addition of a second imaging tool to the tool stack presents problems in telemetering data from the tool stack over the wireline 17. The imaging tools operate simultaneously and continuously during the logging process. The imaging tools operate simultaneously not continuously during the logging process. As the present invention seeks to provide an image that is free of gaps, care is taken to prevent an interruption of imaging data, which interruption could create spot, or even horizontal, gaps. The present invention controls the transmission of data so that all of the data from the tools can be successfully sent to the surface.

Figure 7A:
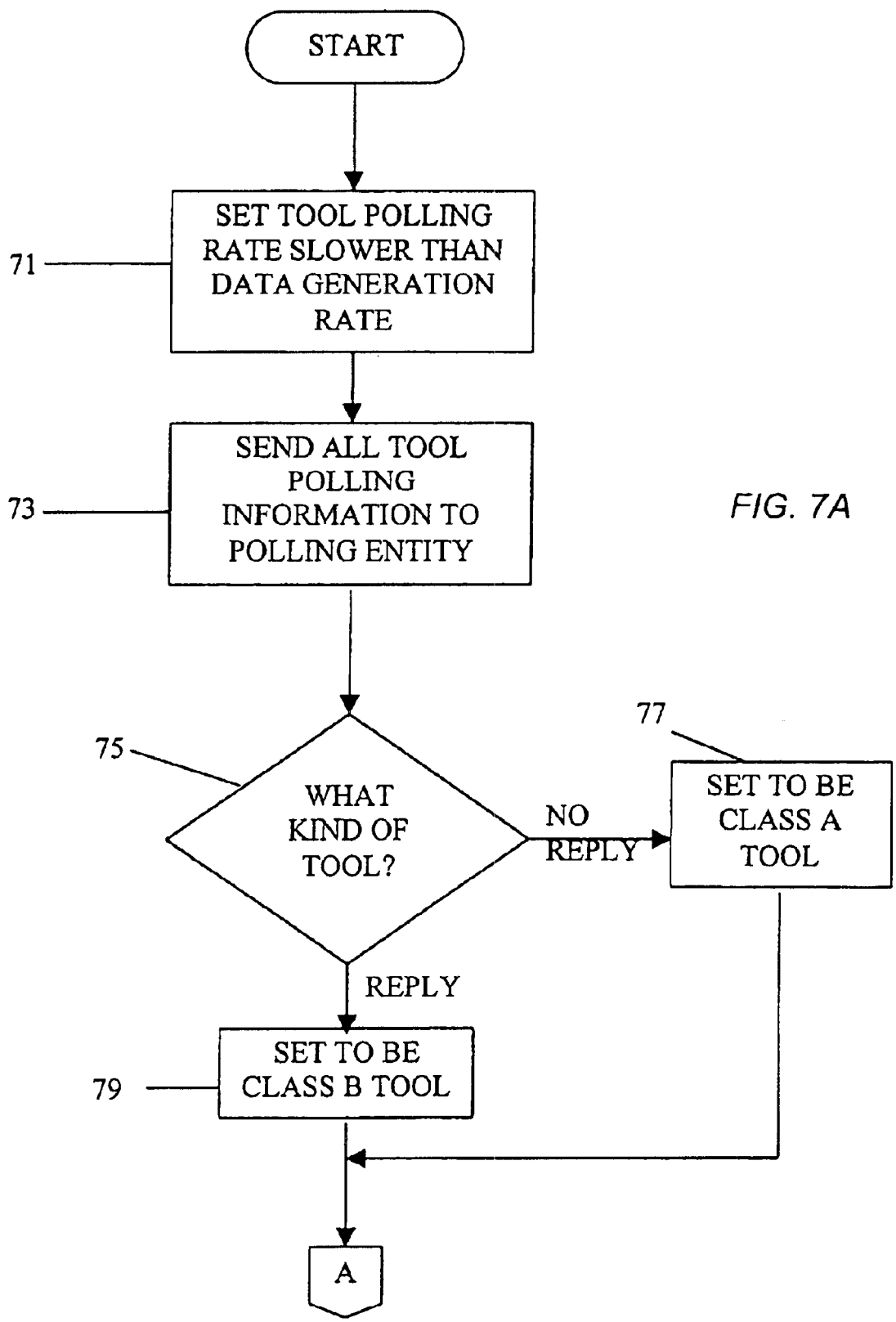
FIGS. 7A and 7B are a flowchart illustrating the modification in the telemetry rate of measurement data from the imaging tools to the surface equipment.
Figure 7B:
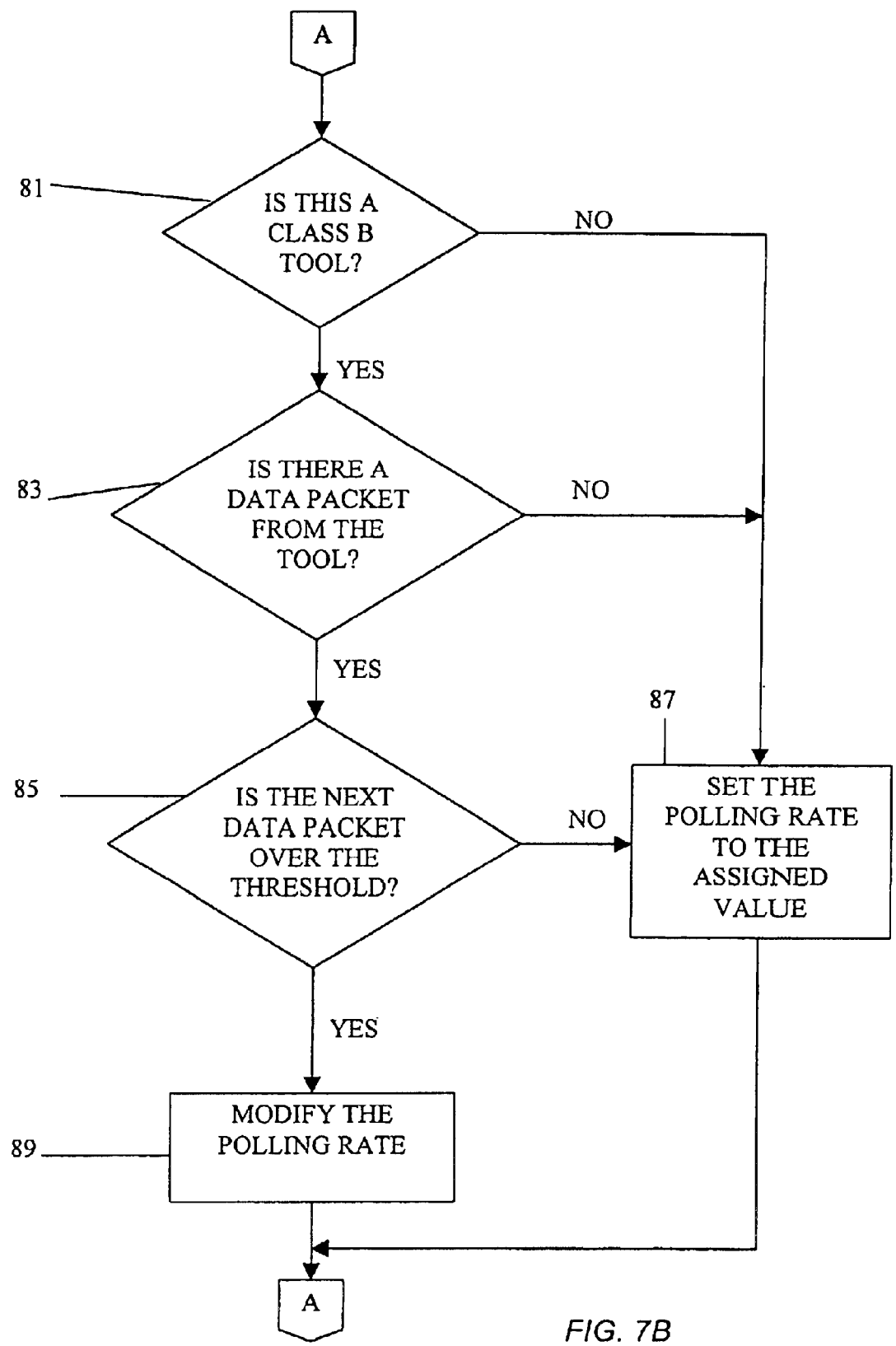

FIGS. 7A and 7B are a flow chart illustrating the method of controlling data transmission over the wireline. The method is implemented by the processor 67 of the telemetry module 39 (see FIG. 6). The telemetry module 39 accepts data over the bus 43 from all of the tools 29U, 29L, 41 in the tool stack. In FIG. 7A, the initial setup is illustrated. The surface processor 25 sends commands or instructions down to the tool stack and initiates the setup. In FIG. 7B, the modification of the polling rate is illustrated.

The telemetry module acquires data over the bus 43 by polling the individual tools. In order to preserve all of the data, the telemetry module 39 adapts, or modifies, the polling rate on a tool-by-tool basis, as well as on a transmission basis. This adaptive polling not only ensures against data loss, but it also provides for the effective use of bandwidth, without the need for overpolling.

The telemetry module 39 communicates with the tools over the bus 43. The telemetry module 39 queries each tool to determine its respective polling rate. Referring to FIG. 7A, in an initial step 71, the polling rate for each tool is set slower than the data generation rate of the tool. For example, the polling rate can be set at five percent slower than the data generation rate. The polling rate is set by a timer, with each tool being assigned a respective timer. The timer is initially set at the polling rate in step 71. Then, the polling information, or data gathering information, is sent from the tool to the telemetry module (the polling entity), step 73.

At initial setup, the telemetry module queries the tool to determine what class of tool it is, step 75. In the preferred embodiment, there are class A and class B tools. A class A tool produces statistical data that can be queried at monotonic intervals without losing data. For example, a class A tool can be a tool containing rollover counters capable of being sampled at regular intervals. Sample intervals can be missed with slight degradations of accuracy. A class B tool is a tool that produces data that must be sampled at the same overall rate of generation in order to capture all data. Any missed samples will destroy the data irrecoverably. Resistivity and neutron and gamma ray lithodensity tools 41 are class A tools, while the imaging tools 29U and 29L are class B tools. In step 75, the telemetry module 39 queries the tool for a reply. No reply indicates that the tool is a class A tool, wherein in step 77, the tool is set to be a class A tool.

After step 77, the method proceeds on to step 81, FIG. 7B.

If the tool being queried is a class B tool, it sends a reply and the method proceeds from step 75 to step 79. In step 79, the tool is set as a class B tool and the method proceeds to step 81.

In steps 81–85 certain conditions are ascertained to determine if the polling rate is to be modified. In step 81, the method determines if the tool is of the class B type (such as one of the imaging tools 29U, 29L). If NO, then in step 87 the polling rate for the tool is set at the assigned value, essentially remaining unchanged. The timer in a class A tool is reset to the initial setting of step 71.

If the result of step 81 is YES, the tool is of the class B type, then, in step 83, the method determines if there is a data packet from the tool.

The imaging tools 29U, 29L each utilize a ring buffer having three "buckets" for data. One bucket is empty and waiting to be filled with data from the data generator 63. Another bucket is being filled by data. The third bucket has already been filled and the data in the third bucket is being sent on the bus 43 and over the wireline 17. The data is moved in packets. As data is continuously being generated and the initial polling rate is set only slightly below the data generation rate, step 83 is used to determine if the tool is acquiring data and conducting logging operations. If the result of step 83 is NO, then the tool is likely not operating and the polling rate is set to the assigned value previously assigned in step 71. If the result of step 83 is YES, the method proceeds to step 85.

In step 85, the method determines if the next data packet, that is the data packet that is next sent from the tool on the bus 43, exceeds a preset threshold. For example, in the preferred embodiment, the threshold is forty percent. If the next data packet is at or under forty percent full, the result is NO and step 87 is performed. If the next data packet is over forty percent full, the result is YES, and the polling rate for that tool is modified, step 89. If the threshold is set relatively low (such as at forty percent), then the polling rate is increased by resetting the timer. The increase can be constant (for example ten percent) or it can be nonconstant so as to make a calculated deviation from the polling rate based upon how full the next data packet is. Such a calculated deviation is typically a one-to-one percentage change over the desired next packet amount over the threshold. As another example of a nonconstant increase, the polling rate can be increased by ten percent for each ten percent fullness over the forty percent threshold. Thus, if the next data packet is forty-five percent full, the polling rate is increased by ten percent; if the next data packet is fifty-five percent full, the polling rate is increased by twenty percent; if the next data packet is sixty-five percent full, the polling rate is increased by thirty percent and so on. After steps 87 and 89, the method returns to step 81. Step 81 is repeated for each tool when the respective timer expires.

If two tools have their respective timers expire simultaneously, then the tools are handled on a random basis. If a tool is delayed so that its next data packet is being filled up, then it will be polled before the other tool due to its timer dynamically reducing and the polling rate increasing.

Thus, with the present invention, the method monitors the amount of data being generated by the imaging tools 29U, 29L. If the generation of data is keeping pace with the rate of telemetered data, then the polling rate remains unchanged. However, if the generated data begins to outpace the telemetered data, the ring buffer in the tool 29U, 29L is filling up. Then, the polling rate is increased so as to empty the ring buffer in the tool and prevent a loss of data. Consequently, data is not lost and the image produced by the two tools is essentially gap free. If the ring buffer in the tool is being emptied relatively fast, the polling rate will be decreased and the timer increased. This allows effective use of the limited available bandwidth.

In the preferred embodiment as shown, the upper and lower imaging tools 29U, 29L are substantially similar and are azimuthally offset from one another. More than two imaging tools can be used. Furthermore, a single imaging tool having the necessary number and azimuthally positioned pads can be used.

At the surface, the processor 25 combines the imaging data from both tools. As an image from a pad is obtained downhole, the time and depth are noted and tagged to the image data. In addition, the identity of the pad is tagged to the image data, to provide relative circumferential position. The processor 25 uses the identifying information of pad identifier, timed and depth of the data to align the image data circumferentially and to correct for the longitudinal offset at the tools 29U, 29L.

The adaptive or dynamic polling discussed herein can be utilized with a variety of tools and logging techniques. Resistivity data in particular is unique; if the data is lost, it is not subject to easy retrieval by interpolation. As an example the adaptive polling can be used with dual lateral log tools, which measures formation resistivity at two depths of investigation simultaneously.

The foregoing disclosure and showings made in the drawings are merely illustrative of the principles of this invention and are not to be interpreted in a limiting sense.

What is claimed is:

1. A downhole tool for imaging a circumference of a wall of a borehole with micro-resistivity measurements, comprising:
   a) an elongated body having a longitudinal axis;
   b) a first set of pads;
   c) a second set of pads;
   d) each of the pads of the first and second sets of pads having micro-resistivity electrodes for micro-resistivity measurements, each of the pads of the first and second sets of pads being mounted on a respective arm, each of the pads of the first and second sets of pads moveable from a respective stowed position against the body of the tool to a radially extended position, wherein in the extended position, the pads are structured and arranged to contact the borehole wall;
   e) each of the pads in the first set of pads being circumferentially separated from the respective adjacent pads in the first set of pads by respective gaps when the first set of pads are in the extended position;
   f) the pads in the second set of pads being circumferentially aligned with the gaps of the first set of pads.

2. The downhole tool of claim 1 wherein the first set of pads is longitudinally spaced from the second set of pads.

3. The downhole tool of claim 1 wherein the pads of the first set of pads are longitudinally separated from the pads and arms of the second set of pads.

4. The downhole tool of claim 1 wherein the tool comprises a tool stack; the first set of pads are provided by a first tool and the second set of pads are provided by a second tool, the tool stack comprising the first and second tools.

5. The downhole tool stack of claim 4 wherein the first tool is separated from the second tool by an isolator.

6. The downhole tool of claim 1 further comprising a telemetry module for transmitting data obtained from the micro-resistivity electrodes to the surface of the borehole.

7. The downhole tool of claim 6 further comprising at least one non-micro-resistivity tool.

8. A downhole tool stack for imaging a circumference of a wall of a borehole which micro-resistivity measurements, comprising:
   a) a first tool;
   b) a second tool longitudinally positioned from the first tool;
   c) each of the first and second tools having plural pads, with each of the pads having micro-resistivity electrodes for micro-resistivity measurements, each of the pads mounted on a respective arm, each of the pads and respective arms moveable between a stowed position and an extended position, the pads being structured and arranged to contact a wall of a borehole;
   d) the pads of the first tool being circumferentially separated from each other by gaps when the pads of the first tool are in the extended position;
   e) the pads of the second tool being circumferentially aligned with the gaps.

9. The downhole tool stack of claim 8 wherein the first tool produces first data and the second tool produces second data, the tool stack further comprising a telemetry module that polls the first tool at a first rate so as to receive the first data for telemetry uphole and that polls the second tool at a second rate so as to receive the second data for telemetry uphole, the telemetry module modifying the rate of polling from the first and second rates so as to correspond to the quantity of data received as a result of the polling.

10. A method of imaging a wall of a borehole with micro-resistivity measurements, comprising the steps of:
   a) acquiring first micro-resistivity imaging data of first portions of the borehole wall from a first tool;

b) acquiring second micro-resistivity imaging data of second portions of the borehole wall from a second tool, the second portions being circumferentially interposed between the first portions, the second tool being operable independently of the first tool;

c) transmitting the first micro-resistivity imaging data and the second micro-resistivity data to a surface of the borehole.

11. The method of claim 10 wherein the steps of acquiring first imaging data of the first portions of the borehole wall from a first tool and acquiring second imaging data of the second portions of the borehole wall from a second tool are performed simultaneously, with the second imaging data of the second portions being longitudinally offset from the first imaging data of the first portions.

12. The method of claim 10 wherein:

a) the step of acquiring imaging data of first portions of the borehole wall from the first tool further comprises the step of polling the first tool for the first tool imaging data at a first rate;

b) modifying the polling rate from the first rate to a second rate so as to correspond to the quantity of data received from the first tool.

13. The method of claim 12 wherein:

a) the step of acquiring imaging data of second portions of the borehole wall from a second tool further comprises the step of polling the second tool for the second tool imaging data at a third rate;

b) modifying the polling rate from the third rate to a fourth rate so as to correspond to the quantity of data received from the second tool.

14. A method of imaging a wall of an uncased borehole, comprising the steps of:

a) providing a logging tool in the borehole, the logging tool having a first set of pads and a second set of pads, the pads of the first set of pads having gaps therebetween the first set of pads deploying independently of the second set of pads, the pads comprising micro-resistivity electrodes;

b) moving the logging tool along the borehole;

c) at a first depth, logging the borehole wall with the first set of pads;

d) continuing to move the logging tool along the borehole;

e) at the first depth, logging the borehole wall with the second set of pads, the pads of the second set of pads being located in the gaps between the first set of pads at the first depth.

15. The method of claim 14 further comprising the steps of:

a) before providing a logging tool in the borehole, determining a rotation of the logging tool within the borehole when the logging tool is moved along the borehole;

b) the step of providing a logging tool in the borehole further comprising the step of providing a circumferential offset between the first set of pads and the second set of pads based on the rotation of the logging tool.

* * * * *